United States Patent
Huang (10) Patent No.: US 10,139,786 B2
(45) Date of Patent: Nov. 27, 2018

(54) WEARABLE DEVICE AND METHOD FOR CONTROLLING THE SAME

(71) Applicant: GOERTEK INC., Weifang (CN)

(72) Inventor: Zhe Huang, Weifang (CN)

(73) Assignee: GOERTEK INC., Weifang, Shandong Province (CN)

( * ) Notice: Subject to any disclaimer, the term of this patent is extended or adjusted under 35 U.S.C. 154(b) by 0 days.

(21) Appl. No.: 15/540,693

(22) PCT Filed: Sep. 5, 2016

(86) PCT No.: PCT/CN2016/098081
§ 371 (c)(1),
(2) Date: Jun. 29, 2017

(87) PCT Pub. No.: WO2017/101526
PCT Pub. Date: Jun. 22, 2017

(65) Prior Publication Data
US 2018/0024504 A1   Jan. 25, 2018

(30) Foreign Application Priority Data

Dec. 18, 2015  (CN) .......................... 2015 1 0963741

(51) Int. Cl.
*H04B 3/36* (2006.01)
*G04G 21/00* (2010.01)
(Continued)

(52) U.S. Cl.
CPC ............. *G04G 21/00* (2013.01); *G01C 21/20* (2013.01); *G01C 21/3652* (2013.01);
(Continued)

(58) Field of Classification Search
CPC ........ G04G 21/00; H02K 33/00; G06F 3/016; G04B 37/1486; G01C 21/20; A44C 5/2071
(Continued)

(56) References Cited

U.S. PATENT DOCUMENTS 9,600,985 B1 * 3/2017 Dow ........................ G08B 6/00
2014/0266607 A1 * 9/2014 Olodort .................... G08B 6/00
340/7.6
(Continued)

FOREIGN PATENT DOCUMENTS

| CN | 101556160 A | 10/2009 |
|---|---|---|
| CN | 103340737 A | 10/2013 |

(Continued)

OTHER PUBLICATIONS

Written Opinion (PCT/ISA/237) dated Nov. 29, 2016, by the State Intellectual Property Office of the P.R.C. for International Application No. PCT/CN2016/098081 (with English translation).

*Primary Examiner* — Tanmay Shah
(74) *Attorney, Agent, or Firm* — Buchanan Ingersoll & Rooney PC (57) ABSTRACT

A wearable device and a method for controlling the same, the wearable device including: a device main body and a wearing part for having the device main body worn on a human body, and the device main body is provided with a micro-controlling unit for controlling operation of the wearable device; and the wearing part is provided with one or more linear motors, each of the linear motors is connected to the micro-controlling unit by a controlling wire, and when the linear motor receives a specified signal of the micro-controlling unit, the linear motor correspondingly vibrates. The wearable device provides one or more linear motors on the wearing part, and controls the linear motors to, upon receiving the specified signal, vibrate, thereby providing the (Continued)

user with a solution of portable vibration tactile feedback and enhancing the user usage experience of the wearable device.

13 Claims, 3 Drawing Sheets

(51) Int. Cl.
*G01C 21/20* (2006.01)
*G06F 1/16* (2006.01)
*G06F 3/01* (2006.01)
*G04B 37/14* (2006.01)
*H02K 33/00* (2006.01)
*G01C 21/36* (2006.01)
*A44C 5/20* (2006.01)

(52) U.S. Cl.
CPC ........... *G04B 37/1486* (2013.01); *G06F 1/16* (2013.01); *G06F 3/01* (2013.01); *G06F 3/016* (2013.01); *H02K 33/00* (2013.01); *A44C 5/2071* (2013.01)

(58) Field of Classification Search
USPC ...................................... 340/407.1
See application file for complete search history.

(56) References Cited

U.S. PATENT DOCUMENTS

| | | | |
|---|---|---|---|
| 2015/0134249 | A1 | 5/2015 | Yen |
| 2015/0189056 | A1 | 7/2015 | Magi |
| 2015/0301608 | A1* | 10/2015 | Nagaraju ............... G06F 3/0488 345/156 |
| 2016/0261299 | A1* | 9/2016 | Hosoi .................... G06F 1/163 |
| 2017/0172476 | A1* | 6/2017 | Schilthuizen ...... A61B 5/14552 |
| 2017/0205773 | A1 | 7/2017 | Zhan et al. |

FOREIGN PATENT DOCUMENTS

| | | |
|---|---|---|
| CN | 104024987 A | 9/2014 |
| CN | 204015338 U | 12/2014 |
| CN | 104353236 A | 2/2015 |
| CN | 104606868 A | 5/2015 |
| CN | 104613959 A | 5/2015 |
| CN | 104634351 A | 5/2015 |
| CN | 104731333 A | 6/2015 |
| CN | 105048548 A | 11/2015 |
| CN | 105139643 A | 12/2015 |
| CN | 105630159 A | 6/2016 |
| CN | 205427703 U | 8/2016 |
| DE | 20 2013 009 744 U1 | 4/2014 |
| WO | WO 2007/105937 A1 | 9/2007 |

* cited by examiner

WEARABLE DEVICE AND METHOD FOR CONTROLLING THE SAME

TECHNICAL FIELD

The present disclosure relates to the technical field of wearable devices, and specifically to a wearable device and a method for controlling the same.

BACKGROUND

At the early stage of development, smart terminal devices, for example, smart phones, provide the user with feedback mainly by sound, and subsequently, as users have increasingly higher requirement on usage experience, sound feedback cannot satisfy the usage demand of the users of smart phones. Some smart phones begin to employ motors to provide vibration tactile feedback. However, as mobile telephones are becoming increasingly thinner, conventional rotor motors cannot adapt the new requirements any more, and thus linear motors emerge.

Currently there are mainly two applications of linear motors in smart phones: touch feedback vibration and reminding vibration. Reminding vibration has been applied on smart phones early, and is mainly employed as a reminder when smart phones receive triggering events such as phone calls and text messages. The main function of touch feedback vibration is to realize point-point sensing effect. For example, when the user points and clicks the screen of a smart phone forcibly, the smart phone provides the user with feedbacks of varying degrees of vibrations according to the different intensities of the point and click.

In recent years, wearable devices are gradually becoming popular, and vibration feedback is more and more applied in wearable devices, to realize touch feedback vibration or reminding vibration. However, currently there is not a perfect and complete vibration feedback solution for wearable devices, users cannot feel richer effects of vibration tactile feedback, which cannot satisfy the usage demands of users in some application conditions, and user experience is poor.

SUMMARY

The present disclosure provides a wearable device and a method for controlling the same, to solve the problem that the users of conventional wearable devices cannot experience richer effects of vibration tactile feedback and the user experience is poor.

According to an aspect of the present disclosure, there is provided a wearable device, the wearable device comprising: a device main body and a wearing part for having the device main body worn on a human body, the device main body is provided with a micro-controlling unit for controlling operation of the wearable device;

the wearing part is provided with one or more linear motors, each of the linear motors is connected to the micro-controlling unit by a controlling wire, and when the linear motor receives a specified signal of the micro-controlling unit, the linear motor correspondingly vibrates.

Optionally, the wearable device is a smart wrist strap device, the device main body is a wrist strap main body, and the wearing part includes a left wrist strap and a right wrist strap that are located on two sides of the wrist strap main body and are able to have the smart wrist strap device worn on a wrist of the user when cooperating with each other;

a left direction linear motor is provided within the left wrist strap, a right direction linear motor is provided within the right wrist strap, and each of the linear motors is connected to the micro-controlling unit by a controlling wire;

during the process of the wearing of the smart wrist strap device, when the left direction linear motor and/or the right direction linear motor receives a specified signal that is sent by the micro-controlling unit, the left direction linear motor and/or the right direction linear motor correspondingly vibrates.

Optionally, a middle direction linear motor is provided on the side of the wrist strap main body that clings to a skin of the human body, the middle direction linear motor is connected to the micro-controlling unit by a controlling wire, and when the middle direction linear motor receives a specified signal that is sent by the micro-controlling unit, the middle direction linear motor correspondingly vibrates.

Optionally, each of the wrist straps is provided with a wrist strap buckle and a plurality of wrist strap buckle holes; and the left direction linear motor and the right direction linear motor are respectively provided inside the left wrist strap and the right wrist strap, wherein, at least two of the wrist strap buckles are respectively provided at the locations on the left wrist strap and the right wrist strap where the left direction linear motor and the right direction linear motor are embedded respectively, and the wrist strap buckles protrude from the surfaces of the left wrist strap and the right wrist strap; the wrist strap buckle corresponding to the left direction linear motor is clipped to one of the wrist strap buckle holes of the right wrist strap, and the wrist strap buckle corresponding to the right direction linear motor is clipped to one of the wrist strap buckle holes of the left wrist strap, to have the smart wrist strap device worn on the wrist of the user.

Optionally, the controlling wires are embedded into the locations of the corresponding wrist straps that do not interfere with the linear motors, the wrist strap buckle holes and the wrist strap buckles, and the controlling wires are integral with the wrist straps.

Optionally, the distance on the wrist strap between the left direction linear motor and the right direction linear motor satisfies the requirement that after the smart wrist strap device has been worn on the wrist of the user, the left direction linear motor is located on a left side of the wrist and the right direction linear motor is located on a right side of the wrist.

Optionally, the numbers of the left direction linear motor and the right direction linear motor are both at least one;

the at least one left direction linear motor and the at least one right direction linear motor are arranged within the corresponding wrist straps according to a predetermined layout, to enhance the vibrating sense in the corresponding directions.

According to another aspect of the present disclosure, there is provided a method for controlling a wearable device, comprising:

acquiring monitored information by using a monitoring unit in a device main body of the wearable device, and transmitting the monitored information to a micro-controlling unit in the device main body;

sending, by a controlling wire, a specified signal that the micro-controlling unit generates according to the monitored information, to one or more linear motors that are provided in a wearing part of the wearable device;

controlling the linear motor to, after receiving the specified signal of the micro-controlling unit, correspondingly vibrate.

Optionally, the wearable device is a smart wrist strap device, the device main body is a wrist strap main body, and the wearing part includes a left wrist strap and a right wrist strap that are located on two sides of the wrist strap main body and are able to have the smart wrist strap device worn on a wrist of the user when cooperating with each other, the method comprises:

providing a left direction linear motor within the left wrist strap, providing a right direction linear motor within the right wrist strap, connecting each of the linear motors to the micro-controlling unit by a controlling wire, and controlling the left direction linear motor and/or the right direction linear motor to, after receiving the specified signal that is sent by the micro-controlling unit, correspondingly vibrate;

providing a middle direction linear motor on the side of the wrist strap main body that clings to a skin of the human body, connecting the middle direction linear motor to the micro-controlling unit by a controlling wire, and controlling the middle direction linear motor to, upon receiving the specified signal that is sent by the micro-controlling unit, correspondingly vibrate.

Optionally, a navigation application is installed in the smart wrist strap device, and the navigation application is provided with a data interface for exchanging data with an operating system of the smart wrist strap device;

to acquire monitored information by using a monitoring unit in a device main body of the wearable device comprises:

acquiring location information and acceleration information of the wearable device by using respectively a signal receiver of a global satellite positioning system and an acceleration sensor in the smart wrist strap device, providing the location information and the acceleration information to the navigation application by the operating system of the smart wrist strap device, so that the navigation application performs logic control judgment according to a preset navigation mode and the location information and the location information, and sends a judgment result to the micro-controlling unit by the operating system.

Optionally, to generate, by the micro-controlling unit, a specified signal according to the monitored information, comprises:

generating, by the micro-controlling unit, according to a judgment result of turning left ahead, a specified signal for controlling the left direction linear motor on the left wrist strap to vibrate;

generating, by the micro-controlling unit, according to a judgment result of turning right ahead, a specified signal for controlling the right direction linear motor on the right wrist strap to vibrate;

generating, by the micro-controlling unit, according to a judgment result of limiting speed ahead, a specified signal for controlling the middle direction linear motor on the wrist strap main body to vibrate;

generating, by the micro-controlling unit, according to a judgment result of turning around ahead, specified signals for controlling the left direction linear motor on the left wrist strap and the right direction linear motor on the right wrist strap to vibrate;

generating, by the micro-controlling unit, according to a judgment result of starting navigation or stopping navigation, specified signals for controlling the left direction linear motor on the left wrist strap, the right direction linear motor on the right wrist strap and the middle direction linear motor on the wrist strap main body to simultaneously vibrate.

Optionally, to generate, by the controlling the linear motor, corresponding vibration after receiving the specified signal of the micro-controlling unit, comprises:

when the specified signal instructs the left direction linear motor to vibrate, controlling the left direction linear motor to vibrate with a predetermined vibration frequency;

when the specified signal instructs the right direction linear motor to vibrate, controlling the right direction linear motor to vibrate with a predetermined vibration frequency;

when the specified signal instructs the middle direction linear motor to vibrate, controlling the middle direction linear motor to vibrate with a predetermined vibration frequency;

when the specified signals instruct the left direction linear motor and the right direction linear motor to vibrate, controlling the left direction linear motor and the right direction linear motor to vibrate with a predetermined vibration frequency;

when the specified signals instruct the left direction linear motor, the right direction linear motor and the middle direction linear motor to simultaneously vibrate, controlling the left direction linear motor, the right direction linear motor and the middle direction linear motor to simultaneously vibrate with a predetermined vibration frequency.

The advantageous effects of the present disclosure are: the embodiments of the present disclosure provide a technical solution for implementing the vibration feedback of wearable devices from aspects of the setting of the vibration sources, the controlling of the vibration mode, and so on. When the vibration sources are provided in the wearing part of the wearable device, because the wearing part has a longer size than the device main body and a larger contact area with the human body, the setting mode of the vibration sources is more flexible, which ensures realizing diversified effects of vibration feedback. The embodiments of the present disclosure provide one or more linear motors as the vibration sources of the wearable device, which are of small volumes and strong vibration sense. Each of the linear motors is connected to the micro-controlling unit by a controlling wire, and when the linear motor receives a specified signal of the micro-controlling unit, the linear motor correspondingly vibrates, with simple wiring and easy controlling. By using the solution, the user, during wearing the wearable device, feels multiple tactile feedback vibrations by the one or more linear motors of the wearing part, which enhances the user usage experience and the competitive power of the wearable device and expands the application area of the wearable device. In addition, the method for controlling a wearable device provided by the embodiments of the present disclosure can realize the controlling on multiple tactile feedback vibrations of the wearable device, which enhances the user usage experience.

DETAILED DESCRIPTION

Figure 1:
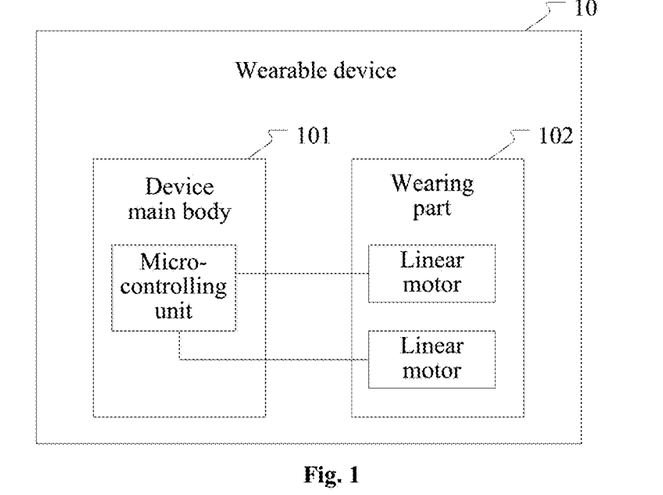
FIG. 1 is the structural block diagram of a wearable device of an embodiment of the present disclosure.

FIG. 1 is the structural block diagram of a wearable device of an embodiment of the present disclosure. Referring to FIG. 1, the wearable device 10 of the present embodiment comprises: a device main body 101 and a wearing part 102 for having the device main body 101 worn on a human body, the device main body 101 is provided with a micro-controlling unit for controlling operation of the wearable device; and the wearing part 102 is provided with one or more linear motors, each of the linear motors is connected to the micro-controlling unit by a controlling wire, and when the linear motor receives a specified signal of the micro-controlling unit, the linear motor correspondingly vibrates.

Currently, by the smart interaction between a wearable device and the user, directions can be determined by visual sense and auditory sense of the user; for example, the wearable device outputs a sound signal to remind the user slipping the screen to the left. Furthermore, the conventional wearable devices are mostly provided with a vibration feedback function, but how to perform direction distinguishing by using tactile sense has not been feasible. Therefore, for the developing of wearable devices the following factors are required to be considered: how to cause the user to have sense of direction when vibrating; how to avoid the uncomfortable feeling of the user in vibration feedback; and how to find a suitable vibration source that can be provided at a proper location of the wearable device without affecting esthetics. By comprehensively considering those factors, the embodiments of the present disclosure employs linear motors, and the linear motors, under a certain arrangement, can solve the problems of sense of direction, experience feeling and esthetics.

The linear motors are smarter vibrating motors, and have the advantages of small volume, strong vibrating sense, easy controlling, simple wiring, few base pins, programmable vibration mode, capability of simulating various vibration modes and so on.

Regarding the problem in the prior art that devices having vibration feedback are not wearable and wearable devices for example smart watches are only provided with a single vibration source within the watch main body, so the user cannot feel, by the wearable device, multiple tactile feedback vibrations of the vibration source, an embodiment of the present disclosure provides the wearable device shown in FIG. 1, and, by providing one or more linear motors in the wearing part of the wearable device, provides the user with portable and multiple tactile feedback vibrations from vibration sources, which enhances user usage experience and feeling.

In another embodiment of the present disclosure, the present solution is described by taking the example where the wearable device 10 in FIG. 1 is a smart watch. Currently, smart watches are devices that are popular in the fields of wearable devices and have strong user adaptability, and they are worn on the wrist of the user and the orientation of the screen surface is fixed. Therefore, according to those characteristics of smart watches, the present disclosure mounts linear motors having small sizes on the watch band of a smart watch and covers the linear motors by using wrist strap buckles, to replace conventional watch band buckles, mounts the linear motors into the smart watch without affecting the esthetics and appearance of the watch, and provides the user with vibration feedbacks in three-axis directions. The linear motor vibration sources that are mounted in the watch band of the smart watch corresponding to the two sides of the wrist of the user, in combination with the vibration source within the main body of the smart watch, realize the three-axis vibration source feedback solution of the smart watch. By using the solution of the embodiments of the present disclosure, the user can, when wearing the smart watch, according to changes of different scenes, obtain tactile feedbacks from different directions.

The structure of the wearable device of the embodiments of the present disclosure will be specifically described below by taking a smart watch as the example.

Figure 2:
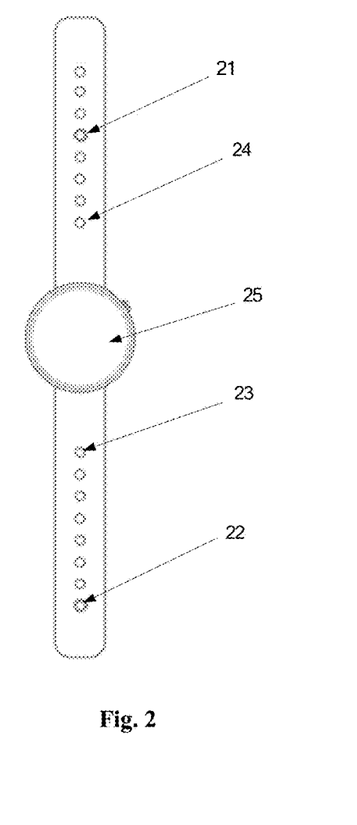
FIG. 2 is the top view of a smart watch in a stretching state of an embodiment of the present disclosure.
Figure 3:
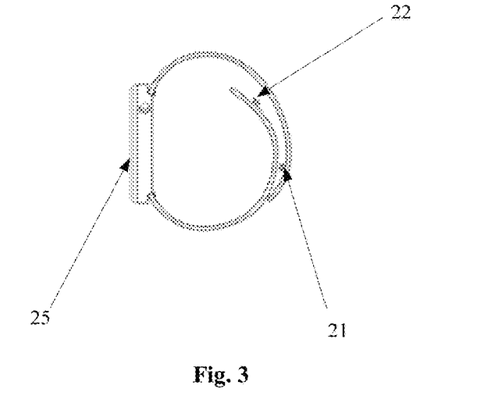
FIG. 3 is the side view of a smart watch in a wearing state of an embodiment of the present disclosure.

FIG. 2 is the top view of a smart watch in a stretching state of an embodiment of the present disclosure. FIG. 3 is the side view of a smart watch in a wearing state of an embodiment of the present disclosure. Referring to FIG. 2 and FIG. 3, the smart watch comprises: a wrist strap main body 25, and a left wrist strap and a right wrist strap that are located on two sides of the wrist strap main body 25 and are able to have the smart watch worn on a wrist of the user when cooperating with each other; a left direction linear motor is provided within the left wrist strap, a right direction linear motor is provided within the right wrist strap, and each of the linear motors is connected to the micro-controlling unit by a controlling wire. During the process of the wearing of the smart watch, when the left direction linear motor and the right direction linear motor receive specified signals that are sent by the micro-controlling unit, the left direction linear motor and the right direction linear motor correspondingly vibrate; or, when the left direction linear motor receives a specified signal that is sent by the micro-controlling unit, the left direction linear motor correspondingly vibrates; or, when the right direction linear motor receives a specified signal that is sent by the micro-controlling unit, the right direction linear motor correspondingly vibrates.

In the present embodiment, a middle direction linear motor is provided on the side of the wrist strap main body 25 of the smart watch that clings to a skin of the human body, the middle direction linear motor is connected to the micro-controlling unit by a controlling wire, and when the middle direction linear motor receives a specified signal that is sent by the micro-controlling unit, the middle direction linear motor correspondingly vibrates.

Referring to FIG. 2 and FIG. 3, the left wrist strap and the right wrist strap are respectively provided with a wrist strap buckle 21, a wrist strap buckle 22 and a plurality of wrist strap buckle holes 23, 24. The left direction linear motor and the right direction linear motor are respectively provided inside the left wrist strap and the right wrist strap, wherein, at least two of the wrist strap buckles (for example, the wrist strap buckle 21 and the wrist strap buckle 22) are respectively provided at the locations on the left wrist strap and the right wrist strap where the left direction linear motor and the right direction linear motor are embedded respectively, and the wrist strap buckle 21 and the wrist strap buckle 22 protrude from the surfaces of the left wrist strap and the right wrist strap (referring to FIG. 3);

the wrist strap buckle 21 corresponding to the left direction linear motor within the left wrist strap is clipped to one of the wrist strap buckle holes 23 of the right wrist strap, and the wrist strap buckle 22 corresponding to the right direction linear motor within the right wrist strap is clipped to one of the wrist strap buckle holes 24 of the left wrist strap, to have the smart watch worn on the wrist of the user.

It should be understood that, for the sake of esthetic appearance, an embodiment of the present disclosure illustrates by FIG. 2 the mounting locations of the wrist strap buckles and the linear motors, that is, in the practical production process, the left direction linear motor and the right direction linear motor can be embedded in the left wrist strap and the right wrist strap, and the locations of the linear motors are covered by the wrist strap buckle 21 and the wrist strap buckle 22, in order not to affect the esthetics and appearance of the smart watch. The present embodiment, by remolding the wrist strap buckles on the surfaces of the linear motors, achieves the effect of embedding the wrist strap buckle holes to fix the smart watch, and realizes mounting the linear motors in the smart watch without affecting the esthetics and appearance of the watch.

Referring to FIG. 3, during the process of the wearing of the smart watch, the distance on the wrist strap between the left direction linear motor and the right direction linear motor satisfies the requirement that after the smart wrist strap device has been worn on the wrist of the user, the left direction linear motor is located on a left side of the wrist and the right direction linear motor is located on a right side of the wrist. Here the distance can be determined according to the sizes of the wrists of different users. Generally the sizes of the wrists of adults and children are not the same, so regarding different users, the distances between the left direction linear motor and the right direction linear motor that are provided on the smart watch are different. In addition, the distance is required to, when the user is clipping the wrist strap buckles into different wrist strap buckle holes and appropriately adjusting the length of the watch band, still satisfy the condition that after the smart wrist strap device has been worn on the wrist of the user, the left direction linear motor is located on a left side of the wrist and the right direction linear motor is located on a right side of the wrist.

In order to clearly describe the present technical solution, the present embodiment employs terms of left direction/left side and right direction/right side, to distinguish different components having the same or similar functions, but not to strictly define the directions. For example, the left side and the right side here refer to the left side and the right side of the wrist of the user, with the horizontal direction of the dial as the reference direction (that is, the middle direction), when the smart watch is being normally worn.

Figure 4:
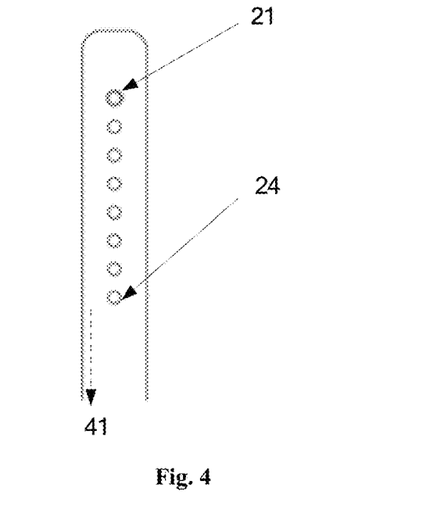
FIG. 4 is the partial side view of the watch band of a smart watch of another embodiment of the present disclosure.

FIG. 4 is the partial side view of the watch band of a smart watch of another embodiment of the present disclosure. The present embodiment mainly describes the controlling wires, and other contents can be seen in other embodiments of the present disclosure. Referring to FIG. 4, the controlling wires are embedded into the locations of the corresponding wrist straps that do not interfere with the linear motors, the wrist strap buckle hole 24 and the wrist strap buckle 21 (for example, the side location shown by the dashed line 41), and the controlling wires are integral with the wrist straps. The controlling wires are arranged to not to interfere with the linear motors within the wrist straps, the wrist strap buckle holes and the wrist strap buckles, and are integral with the wrist straps, thereby ensuring that the sizes of the wrist straps of the smart watch can be designed smaller, which is aesthetic and saves the manufacturing cost of the smart watch.

Figure 5:
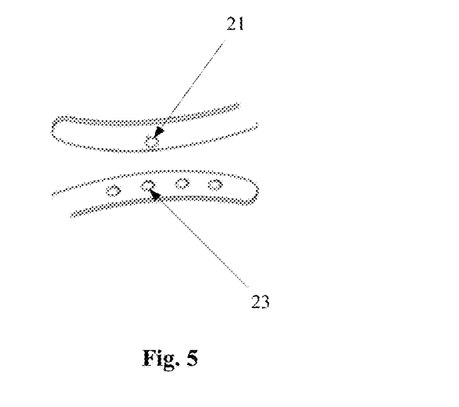
FIG. 5 is the partial structural schematic diagram of a smart watch of another embodiment of the present disclosure when the left wrist strap and the right wrist strap are cooperating.

FIG. 5 is the partial structural schematic diagram of a smart watch of another embodiment of the present disclosure when the left wrist strap and the right wrist strap are cooperating with each other. The present embodiment mainly describes the clipping mode, and other contents can be seen in other embodiments of the present disclosure. Referring to FIG. 5 and FIG. 3, when the left wrist strap (that is, the wrist strap where the wrist strap buckle 21 is located) is an inward-clipping wrist strap, and the right wrist strap (the wrist strap where the wrist strap buckle 22 is located) is an outward-clipping wrist strap, the wrist strap buckle 21 on the left wrist strap is clipped inwardly into the wrist strap buckle hole 23 of the outward-clipping wrist strap, and the wrist strap buckle 22 on the right wrist strap is clipped outwardly into the wrist strap buckle hole 24 of the inward-clipping wrist strap.

The smart watch is a device that is worn on the wrist of the user. Therefore, by clipping cooperation fixing of the wrist strap buckles and wrist strap buckle holes provided on the left wrist strap and the right wrist strap respectively, the smart watch is worn on the wrist of the user. In the present embodiment, referring to FIG. 5 and FIG. 2, each of the wrist straps is provided with a plurality of wrist strap buckle holes, which facilitates the user adjusting according to the size of the wrist in wearing and satisfies personalized demands of users.

In the present embodiment, illustratively there can be provided a plurality of linear motors on each of the wrist straps, and the plurality of linear motors can be arranged according to a predetermined layout. Accordingly, after the smart watch is worn on the wrist of the user, when the plurality of linear motors on the left side of the wrist of the user receive specified signals that are sent by the micro-controlling unit, the plurality of linear motors can simultaneously vibrate, which enhances the vibration sense of the left side of the wrist. In addition, the present embodiment illustrates the case that a wrist strap buckle 21 and a wrist strap buckle 22 are provided on each of the wrist straps, and it can be understood that, in other embodiments of the present disclosure, a plurality of wrist strap buckles can be provided, and the locations of the wrist strap buckles on the wrist straps can be not corresponding to the locations of the linear motors on the wrist straps, which is not limited. In addition, when the number of the linear motors on each of the wrist straps is more than one, the layout of the plurality of linear motors can be a straight line or a "S" shape, and the plurality of linear motors being arranged according to a predetermined layout satisfies personalized demands of users, and can realize sufficiently utilizing the room of the wrist straps.

The above embodiments introduce the structure of the smart watch. When wearing the smart watch of the above embodiments, the user can, according to the changing of the application scenes in the smart watch, by using the at least one linear motor that is respectively provided in the left wrist strap and the right wrist strap of the smart watch, and in combination with the vibration of the linear motors that are provided within the dial main body of the smart watch, sense the vibrations of the vibration sources in three-axis directions (the left direction, the middle direction and the right direction) when wearing the smart watch of the present embodiment, and obtain vibration tactile feedbacks from different directions, and can, by the vibrations of the linear motors on the left side and the right side of the wrist and within the dial main body, perform direction distinguishing, which optimizes the user usage experience.

The working process of the smart watch of the embodiments of the present disclosure is described below by referring to a specific usage scene. It should be understood that, on the basis of the structure of the smart watch of the present embodiment (that is, the three axial linear motors that are provided on the dial main body, the left wrist strap and the right wrist strap), various suitable applications can be developed and installed to the smart watch, to expand the application area of the smart watch.

In the present embodiment, the application scene is preferably a car driving navigation scene. Specifically, a navigation application that is suitable for the smart watch in terms of screen size characteristic (for example, a minisize round screen or square screen) and interaction characteristic (for example, the navigation information cannot be conveniently viewed from a navigation map intuitively, and reminding and feedback are usually made by voice reminding, text or tactile interaction) can be installed in the smart watch, wherein the size of the user interaction interface of the navigation application satisfies the screen size characteristic of the wearable device, and the user interaction mode satisfies the information interaction mode of the wearable device.

The navigation application provides some data interfaces, for example, a map information API (Application Programming Interface), a positioning information API interface and a navigation scene API, to exchange data with the operating system that runs in the smart watch.

The navigation application uses a navigation information interface of a third-party map application company, configures a linear motor control logic program in the navigation application, and according to the movement information that is collected by an information collecting device that is installed in the smart watch, by referring to the linear motor control logic program and the navigation scene, outputs different judgment results, so that the user, when using the smart watch, according to the change of the navigation scene in the navigation application, experiences vibration tactile feedbacks from different directions. The information collecting device here refers to for example an acceleration sensor, a gyroscope or other devices that can monitor and collect movement information. The movement information comprises: the information on whether the smart watch is currently in the motion state, the information on the direction and speed of movement in the motion state, and so on.

Figure 6:
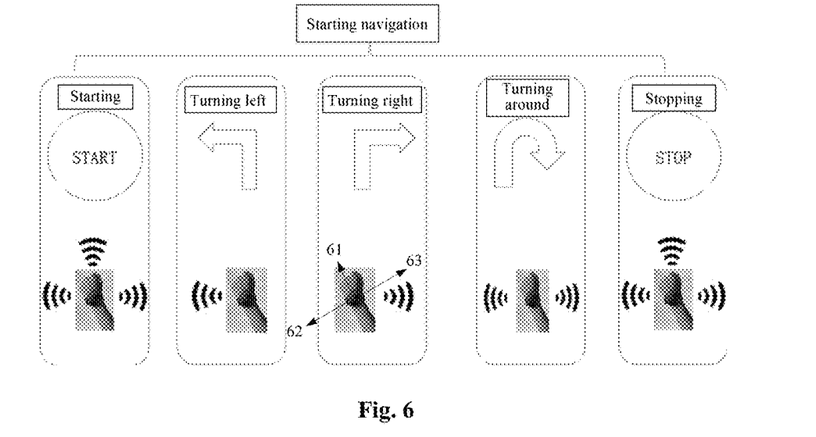
FIG. 6 is the schematic diagram of an application scene of a smart watch of an embodiment of the present disclosure.

FIG. 6 is the schematic diagram of an application scene of a smart watch of an embodiment of the present disclosure. A navigation application after the completion of development is installed in the smart watch, and when the user is in the scene of the car driving navigation application, FIG. 6 illustrates the directionality information corresponding to the smart watch when the smart watch is worn on the wrist of the user, wherein schematically: 61 represents the middle direction (a natural direction when the user is normally wearing), 62 represents the left direction, and 63 represents the right direction.

Referring to FIG. 6, according to the change of the navigation scene, the navigation application outputs different judgment results, and by the operating system of the smart watch, outputs the judgment results to the micro-controlling unit of the smart watch. The micro-controlling unit in turn generates corresponding specified signals according to the judgment results, and sends those specified signals to the linear motors that are mounted in the smart watch, to control the linear motors to vibrate, thereby realizing the vibration tactile feedbacks of the linear motors in different directions.

If the navigation application reminds turning left in the front road crossing, and outputs the judgment result of vibrating the left direction linear motor to the micro-controlling unit, the micro-controlling unit of the smart watch, according to the judgment result, generates a specified signal for controlling the linear motor on the left side of the natural direction to vibrate, and sends the specified signal to the left direction linear motor that is located on the left side of the wrist of the user;

if the navigation application reminds turning right in the front road crossing, and outputs the judgment result of vibrating the right direction linear motor to the micro-controlling unit, the micro-controlling unit of the smart watch, according to the judgment result, generates a specified signal for controlling the linear motor on the right side of the natural direction to vibrate, and sends the specified signal to the right direction linear motor that is located on the right side of the wrist of the user;

if the navigation application reminds that the front road section limits speed or has a camera, and outputs the judgment result of vibrating the middle direction linear motor to the micro-controlling unit, the micro-controlling unit of the smart watch, according to the judgment result, generates a specified signal for controlling the linear motor in the natural direction within the dial, and sends the specified signal to the middle direction linear motor that is provided within the dial;

if the navigation application reminds turning around in the front road crossing, and outputs the judgment result of simultaneously vibrating the left direction linear motor and the right direction linear motor to the micro-controlling unit, the micro-controlling unit of the smart watch, according to the judgment result, generates specified signals for controlling the linear motors on the left side and the right side of the wrist of the user to simultaneously vibrate, and sends the specified signals to the linear motors on the left side and the right side of the wrist of the user;

if the navigation application reminds stopping the navigation, and outputs the judgment result of simultaneously vibrating the left direction linear motor, the right direction linear motor and the middle direction linear motor to the micro-controlling unit, the micro-controlling unit of the smart watch, according to the judgment result, generates specified signals for controlling the linear motors within the dial, on the left side of the wrist of the user and on the right side of the wrist of the user to simultaneously vibrate, and sends the specified signals to the left direction linear motor, the right direction linear motor and the middle direction linear motor.

Thereby, when the user is using the smart watch, even if the user cannot easily obtain the navigation information by directly viewing the user interface of the navigation application (because the screen size of the smart watch is generally small, and thus the information that can be displayed is limited, during the navigation, the user cannot easily directly view that), the user can distinguish the direction according to the tactile vibration feedbacks of the three dimensions of the left direction linear motor, the right direction linear motor and the middle direction linear motor within the dial, to achieve the aim of navigation.

In an embodiment of the present disclosure, the vibration mode of the linear motors can be designed and controlled. For example, by referring to different application scenes, the vibration mode can be set as: one side vibration/total vibration/joint vibration, which is not limited.

Figure 7:
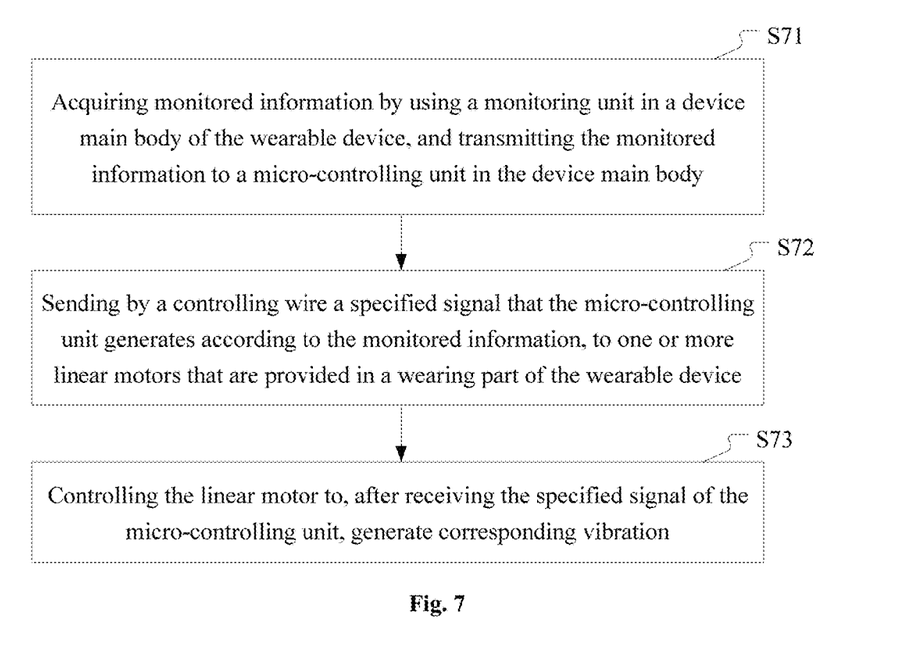
FIG. 7 is the flow chart of a method for controlling a wearable device of an embodiment of the present disclosure.

In another embodiment of the present disclosure, there is provided a method for controlling a wearable device. FIG. 7 is the flow chart of a method for controlling a wearable device of an embodiment of the present disclosure. Referring to FIG. 7, the method comprises:

Step S71, acquiring monitored information by using a monitoring unit in a device main body of the wearable device, and transmitting the monitored information to a micro-controlling unit in the device main body;

Step S72, sending, by a controlling wire, a specified signal that the micro-controlling unit generates according to the monitored information, to one or more linear motors that are provided in a wearing part of the wearable device;

Step S73, controlling the linear motor to, after receiving the specified signal of the micro-controlling unit, generate corresponding vibration.

The above Steps S71 to S73 can be implemented by the micro-controlling unit or functional units thereof, and can also be implemented by other controlling chips in the device.

In an embodiment of the present disclosure, the wearable device is a smart wrist strap device, the device main body is a wrist strap main body, and the wearing part includes a left wrist strap and a right wrist strap that are located on two sides of the wrist strap main body and are able to have the smart wrist strap device worn on a wrist of the user when cooperating with each other, and the method shown in FIG. 7 comprises:

providing a left direction linear motor within the left wrist strap, providing a right direction linear motor within the right wrist strap, connecting each of the linear motors to the micro-controlling unit by a controlling wire, and controlling the left direction linear motor and/or the right direction linear motor to, after receiving the specified signal that is sent by the micro-controlling unit, correspondingly vibrate; and providing a middle direction linear motor on the side of the wrist strap main body that clings to a skin of the human body, connecting the middle direction linear motor to the micro-controlling unit by a controlling wire, and controlling the middle direction linear motor to, upon receiving the specified signal that is sent by the micro-controlling unit, correspondingly vibrate.

In an embodiment of the present disclosure, a navigation application is installed in the smart wrist strap device, and the navigation application is provided with a data interface for exchanging data with an operating system of the smart wrist strap device; and to acquire monitored information by using a monitoring unit in a device main body of the wearable device comprises:

acquiring location information and acceleration information of the wearable device by using respectively a signal receiver of a global satellite positioning system and an acceleration sensor in the smart wrist strap device, providing the location information and the acceleration information to the navigation application by the operating system of the smart wrist strap device, so that the navigation application performs logic control judgment according to a preset navigation mode and the location information and the location information, and sends a judgment result to the micro-controlling unit by the operating system.

In an embodiment of the present disclosure, the generating by the micro-controlling unit a specified signal according to the monitored information comprises:

generating, by the micro-controlling unit, according to a judgment result of turning left ahead, a specified signal for controlling the left direction linear motor on the left wrist strap to vibrate; generating, by the micro-controlling unit, according to a judgment result of turning right ahead, a specified signal for controlling the right direction linear motor on the right wrist strap to vibrate; generating, by the micro-controlling unit, according to a judgment result of limiting speed ahead, a specified signal for controlling the middle direction linear motor on the wrist strap main body to vibrate; generating, by the micro-controlling unit, according to a judgment result of turning around ahead, specified signals for controlling the left direction linear motor on the left wrist strap and the right direction linear motor on the right wrist strap to simultaneously vibrate; and generating, by the micro-controlling unit, according to a judgment result of starting navigation or stopping navigation, specified signals for controlling the left direction linear motor on the left wrist strap, the right direction linear motor on the right wrist strap and the middle direction linear motor on the wrist strap main body to simultaneously vibrate.

In an embodiment of the present disclosure, Step S73 specifically comprises: when the specified signal instructs the left direction linear motor to vibrate, controlling the left direction linear motor to vibrate with a predetermined vibration frequency; when the specified signal instructs the right direction linear motor to vibrate, controlling the right direction linear motor to vibrate with a predetermined vibration frequency; when the specified signal instructs the middle direction linear motor to vibrate, controlling the middle direction linear motor to vibrate with a predetermined vibration frequency; when the specified signals instruct the left direction linear motor and the right direction linear motor to vibrate, controlling the left direction linear motor and the right direction linear motor to vibrate with a predetermined vibration frequency; and when the specified signals instruct the left direction linear motor, the right direction linear motor and the middle direction linear motor to simultaneously vibrate, controlling the left direction linear motor, the right direction linear motor and the middle direction linear motor to simultaneously vibrate with a predetermined vibration frequency.

In an embodiment of the present disclosure, each of the wrist straps of the smart wrist strap device is provided with a wrist strap buckle and a plurality of wrist strap buckle holes;

to provide a left direction linear motor within the left wrist strap, providing a right direction linear motor within the right wrist strap comprises:

embedding the left direction linear motor and the right direction linear motor respectively within the locations on the left wrist strap and the right wrist strap that are corresponding to the wrist strap buckles, and protruding the wrist strap buckles from the surfaces of the left wrist strap and the right wrist strap; and the left wrist strap and the right wrist strap, by clipping the wrist strap buckle corresponding to the left direction linear motor to one of the wrist strap buckle holes of the right wrist strap, and clipping the wrist strap buckle corresponding to the right direction linear motor to one of the wrist strap buckle holes of the left wrist strap, having the smart wrist strap device worn on the wrist of the user.

In an embodiment of the present disclosure, to connect each of the linear motors to the micro-controlling unit by a controlling wire comprises:

providing controlling wires that are integral with the wrist straps at the locations of the corresponding wrist straps that do not interfere with the linear motors, the wrist strap buckle holes and the wrist strap buckles, and connecting the controlling wires with the linear motors and the micro-controlling unit respectively.

In an embodiment of the present disclosure, the providing a left direction linear motor within the left wrist strap, providing a right direction linear motor within the right wrist strap further comprises: providing the left direction linear motor at a preset location of the left wrist strap and providing the right direction linear motor at a preset location with the right wrist strap, so that after the smart wrist strap device has been worn on the wrist of the user, the left direction linear motor is located on a left side of the wrist and the right direction linear motor is located on a right side of the wrist.

It should be understood that, the steps of the method for controlling a wearable device of the present embodiment are corresponding to the working process of the above wearable device. Therefore, the detailed steps for implementing the method for controlling a wearable device of the present embodiment can be seen in the above relevant description of the wearable device, and will not be in detail described here.

In conclusion, the embodiments of the present disclosure provide a technical solution for implementing the vibration feedback of wearable devices from aspects of the setting of the vibration sources, the controlling of the vibration mode, and so on. When the vibration sources are provided in the wearing part of the wearable device, because the wearing part has a longer size than the device main body and a larger contact area with the human body, the providing mode of the vibration sources is more flexible, which ensures realizing diversified effects of vibration feedback. The embodiments of the present disclosure provide one or more linear motors as the vibration sources of the wearable device, which are of small volumes and strong vibration sense. Each of the linear motors is connected to the micro-controlling unit by a controlling wire, and when the linear motor receives a specified signal of the micro-controlling unit, the linear motor correspondingly vibrates, with simple wiring and easy controlling. By using the solution, the user, during wearing the wearable device, feels multiple tactile feedback vibrations by the one or more linear motors of the wearing part, which enhances the user usage experience and the competitive power of the wearable device and expands the application area of the wearable device. In addition, the method for controlling a wearable device provided by the present disclosure can realize the controlling on multiple tactile feedback vibrations of the wearable device, which enhances the user usage experience. The above descriptions are merely preferable embodiments of the present disclosure, and are not limiting the protection scope of the present disclosure. Any modifications, equivalent substitutions or improvements that are made within the spirit and principle of the present disclosure are all included in the protection scope of the present disclosure.

What is claimed is:

1. A wearable device, comprising:
a device main body and a wearing part for having the device main body worn on a human body,
the device main body is provided with a micro-controlling unit for controlling operation of the wearable device; and
the wearing part is provided with one or more linear motors, each of the linear motors is connected to the micro-controlling unit by a controlling wire, and when the linear motor receives a specified signal of the micro-controlling unit, the linear motor correspondingly vibrates,
wherein the wearable device is a smart wrist strap device, the device main body is a wrist strap main body, and the wearing part includes a left wrist strap and a right wrist strap that are located on two sides of the wrist strap main body and are able to have the smart wrist strap device worn on a wrist of the user when cooperating with each other;
a left direction linear motor is provided within the left wrist strap, a right direction linear motor is provided within the right wrist strap, and each of the linear motors is connected to the micro-controlling unit by a controlling wire, and
during the process of the wearing of the smart wrist strap device, when the left direction linear motor and/or the right direction linear motor receives a specified signal that is sent by the micro-controlling unit, the left direction linear motor and/or the right direction linear motor correspondingly vibrates.

2. The device according to claim 1, wherein, a middle direction linear motor is provided on the side of the wrist strap main body that clings to a skin of the human body, the middle direction linear motor is connected to the micro-controlling unit by a controlling wire, and when the middle direction linear motor receives a specified signal that is sent by the micro-controlling unit, the middle direction linear motor correspondingly vibrates.

3. The device according to claim 1, wherein, each of the wrist straps is provided with a wrist strap buckle and a plurality of wrist strap buckle holes; and the left direction linear motor and the right direction linear motor are respectively provided inside the left wrist strap and the right wrist strap,
wherein, at least two of the wrist strap buckles are respectively provided at the locations on the left wrist strap and the right wrist strap where the left direction linear motor and the right direction linear motor are embedded respectively, and the wrist strap buckles protrude from the surfaces of the left wrist strap and the right wrist strap; and
the wrist strap buckle corresponding to the left direction linear motor is clipped to one of the wrist strap buckle holes of the right wrist strap, and the wrist strap buckle corresponding to the right direction linear motor is clipped to one of the wrist strap buckle holes of the left wrist strap, to have the smart wrist strap device worn on the wrist of the user.

4. The device according to claim 3, wherein, the controlling wires are embedded into the locations of the corresponding wrist straps that do not interfere with the linear motors, the wrist strap buckle holes and the wrist strap buckles, and the controlling wires are integral with the wrist straps.

5. The device according to claim 1, wherein, the distance on the wrist strap between the left direction linear motor and the right direction linear motor satisfies the requirement that after the smart wrist strap device has been worn on the wrist of the user, the left direction linear motor is located on a left side of the wrist and the right direction linear motor is located on a right side of the wrist.

6. The device according to claim 1, wherein, the numbers of the left direction linear motor and the right direction linear motor are both at least one; and
the at least one left direction linear motor and the at least one right direction linear motor are arranged within the corresponding wrist straps according to a predetermined layout, to enhance the vibrating sense in the corresponding directions.

7. A method for controlling a wearable device, comprising:
acquiring monitored information by using a monitoring unit in a device main body of the wearable device, and transmitting the monitored information to a micro-controlling unit in the device main body;
sending, by a controlling wire, a specified signal that the micro-controlling unit generates according to the monitored information, to one or more linear motors that are provided in a wearing part of the wearable device; and controlling the linear motor to, after receiving the specified signal of the micro-controlling unit, correspondingly vibrate, wherein, the wearable device is a smart wrist strap device, the device main body is a wrist strap main body, and the wearing part includes a left wrist strap and a right wrist strap that are located on two sides of the wrist strap main body and are able to have the smart wrist strap device worn on a wrist of the user when cooperating with each other, the method comprises:

providing a left direction linear motor within the left wrist strap, providing a right direction linear motor within the right wrist strap, connecting each of the linear motors to the micro-controlling unit by a controlling wire, and controlling the left direction linear motor and/or the right direction linear motor to, after receiving the specified signal that is sent by the micro-controlling unit, correspondingly vibrate; and providing a middle direction linear motor on the side of the wrist strap main body that clings to a skin of the human body, connecting the middle direction linear motor to the micro-controlling unit by a controlling wire, and controlling the middle direction linear motor to, upon receiving the specified signal that is sent by the micro-controlling unit, correspondingly vibrate.

8. The method according to claim 7, wherein, a navigation application is installed in the smart wrist strap device, and the navigation application is provided with a data interface for exchanging data with an operating system of the smart wrist strap device;

the acquiring monitored information by using a monitoring unit in a device main body of the wearable device comprises:

acquiring location information and acceleration information of the wearable device by using respectively a signal receiver of a global satellite positioning system and an acceleration sensor in the smart wrist strap device, providing the location information and the acceleration information to the navigation application by the operating system of the smart wrist strap device so that the navigation application performs logic control judgment according to a preset navigation mode and the location information and the acceleration information, and sends a judgment result to the micro-controlling unit by the operating system.

9. The method according to claim 8, wherein, a specified signal that the micro-controlling unit generates according to the monitored information comprises:

generating, by the micro-controlling unit, according to a judgment result of turning left ahead, a specified signal for controlling the left direction linear motor on the left wrist strap to vibrate;

generating, by the micro-controlling unit, according to a judgment result of turning right ahead, a specified signal for controlling the right direction linear motor on the right wrist strap to vibrate;

generating, by the micro-controlling unit, according to a judgment result of limiting speed ahead, a specified signal for controlling the middle direction linear motor on the wrist strap main body to vibrate;

generating, by the micro-controlling unit, according to a judgment result of turning around ahead, specified signals for controlling the left direction linear motor on the left wrist strap and the right direction linear motor on the right wrist strap to vibrate;

generating, by the micro-controlling unit, according to a judgment result of starting navigation or stopping navigation, specified signals for controlling the left direction linear motor on the left wrist strap, the right direction linear motor on the right wrist strap and the middle direction linear motor on the wrist strap main body to simultaneously vibrate.

10. The method according to claim 9, wherein, the controlling the linear motor to, after receiving the specified signal of the micro-controlling unit, correspondingly vibrate comprises:

when the specified signal instructs the left direction linear motor to vibrate, controlling the left direction linear motor to vibrate with a predetermined vibration frequency;

when the specified signal instructs the right direction linear motor to vibrate, controlling the right direction linear motor to vibrate with a predetermined vibration frequency;

when the specified signal instructs the middle direction linear motor to vibrate, controlling the middle direction linear motor to vibrate with a predetermined vibration frequency;

when the specified signals instruct the left direction linear motor and the right direction linear motor to vibrate, controlling the left direction linear motor and the right direction linear motor to vibrate with a predetermined vibration frequency;

when the specified signals instruct the left direction linear motor, the right direction linear motor and the middle direction linear motor to simultaneously vibrate, controlling the left direction linear motor, the right direction linear motor and the middle direction linear motor to simultaneously vibrate with a predetermined vibration frequency.

11. The method according to claim 7, wherein, each of the wrist straps of the smart wrist strap device is provided with a wrist strap buckle and a plurality of wrist strap buckle holes;

the providing a left direction linear motor within the left wrist strap, providing a right direction linear motor within the right wrist strap comprises:

embedding the left direction linear motor and the right direction linear motor respectively within the locations on the left wrist strap and the right wrist strap that are corresponding to the wrist strap buckles, and protruding the wrist strap buckles from the surfaces of the left wrist strap and the right wrist strap;

the left wrist strap and the right wrist strap, by clipping the wrist strap buckle corresponding to the left direction linear motor to one of the wrist strap buckle holes of the right wrist strap, and clipping the wrist strap buckle corresponding to the right direction linear motor to one of the wrist strap buckle holes of the left wrist strap, having the smart wrist strap device worn on the wrist of the user.

12. The method according to claim 9, wherein, the connecting each of the linear motors to the micro-controlling unit by a controlling wire comprises:

providing controlling wires that are integral with the wrist straps at the locations of the corresponding wrist straps that do not interfere with the linear motors, the wrist strap buckle holes and the wrist strap buckles, and connecting the controlling wires with the linear motors and the micro-controlling unit.

13. The method according to claim 7, wherein, the providing a left direction linear motor within the left wrist strap, providing a right direction linear motor within the right wrist strap further comprises:

providing the left direction linear motor at a preset location of the left wrist strap and providing the right direction linear motor at a preset location of the right wrist strap, so that after the smart wrist strap device has been worn on the wrist of the user, the left direction linear motor is located on a left side of the wrist and the right direction linear motor is located on a right side of the wrist.

\* \* \* \* \*